(12) United States Patent
Sato et al.

(10) Patent No.: US 9,046,638 B2
(45) Date of Patent: Jun. 2, 2015

(54) WHITE REFLECTION FILM

(75) Inventors: Yoshikazu Sato, Shiga (JP); Yoshihiko Sakaguchi, Shiga (JP); Osamu Watanabe, Shiga (JP)

(73) Assignee: Toray Industries, Inc. (JP)

( * ) Notice: Subject to any disclaimer, the term of this patent is extended or adjusted under 35 U.S.C. 154(b) by 319 days.

(21) Appl. No.: 12/305,670

(22) PCT Filed: Jun. 8, 2007

(86) PCT No.: PCT/JP2007/061596
§ 371 (c)(1),
(2), (4) Date: Dec. 19, 2008

(87) PCT Pub. No.: WO2007/148544
PCT Pub. Date: Dec. 27, 2007

(65) Prior Publication Data
US 2010/0189959 A1    Jul. 29, 2010

(30) Foreign Application Priority Data

Jun. 23, 2006 (JP) ................................. 2006-173537

(51) Int. Cl.
| | |
|---|---|
| *B32B 5/16* | (2006.01) |
| *B32B 3/00* | (2006.01) |
| *G02B 5/02* | (2006.01) |
| *G02B 5/08* | (2006.01) |
| *G02F 1/1335* | (2006.01) |

(52) U.S. Cl.
CPC ....... *G02B 5/0226* (2013.01); *Y10T 428/24372* (2015.01); *G02B 5/0284* (2013.01); *G02B 5/0808* (2013.01); *G02F 1/133605* (2013.01)

(58) Field of Classification Search
USPC .......................................... 428/143; 359/453
See application file for complete search history.

(56) References Cited

U.S. PATENT DOCUMENTS

| | | | |
|---|---|---|---|
| 6,535,337 B1 | 3/2003 | Tanaka et al. | |
| 6,596,375 B2 * | 7/2003 | Murata et al. | 428/144 |
| 7,033,057 B2 * | 4/2006 | Su et al. | 362/558 |
| 2002/0001055 A1 | 1/2002 | Kimura et al. | |
| 2002/0113925 A1 * | 8/2002 | Higashi | 349/113 |
| 2003/0053008 A1 | 3/2003 | Nakano | |
| 2004/0257793 A1 | 12/2004 | Wakabayashi | |
| 2005/0030630 A1 * | 2/2005 | Ohnishi et al. | 359/599 |
| 2005/0070632 A1 | 3/2005 | Chien et al. | |
| 2006/0017860 A1 * | 1/2006 | Adachi et al. | 349/1 |
| 2006/0263592 A1 * | 11/2006 | Kusume et al. | 428/327 |
| 2008/0037261 A1 * | 2/2008 | Chari et al. | 362/326 |
| 2008/0049419 A1 * | 2/2008 | Ma et al. | 362/225 |

FOREIGN PATENT DOCUMENTS

| | | | |
|---|---|---|---|
| JP | 7-110476 A | | 4/1995 |
| JP | 07110476 A | * | 4/1995 |
| JP | 8-262208 A | | 10/1996 |

(Continued)

*Primary Examiner* — Maria Veronica Ewald
*Assistant Examiner* — Laura Auer
(74) *Attorney, Agent, or Firm* — DLA Piper LLP (US)

(57) ABSTRACT

A white reflection film includes a coating layer including spherical particles on at least one surface of a white film, wherein, when particle diameters of the spherical particles are R and a thickness of the coating layer is H, an average number of the particles satisfying R>H in 100H square in a surface area of the coating layer is at least 10. The white film, which is capable of contributing to the improvement of luminance of a backlight being used in the backlight, can be provided.

9 Claims, 1 Drawing Sheet

(56) References Cited

FOREIGN PATENT DOCUMENTS

| | | | |
|---|---|---|---|
| JP | 2000-105304 A | 4/2000 | |
| JP | 2001-166295 A | 6/2001 | |
| JP | 2001-324608 A | 11/2001 | |
| JP | 2002-090515 A | 3/2002 | |
| JP | 2002-90515 A | 3/2002 | |
| JP | 2002-138150 A | 5/2002 | |
| JP | 2002-333510 A | 11/2002 | |
| JP | 2003-092018 A | 3/2003 | |
| JP | 2003-107216 A | 4/2003 | |
| JP | 2004-198743 A | 7/2004 | |
| JP | 2004198743 A * | 7/2004 | |
| JP | 2004-325964 A | 11/2004 | |
| JP | 2005-121858 A | 5/2005 | |
| JP | 2005-173546 A | 6/2005 | |
| WO | 03/005072 A1 | 1/2003 | |
| WO | 03/032073 A1 | 4/2003 | |
| WO | WO 2005026241 A1 * | 3/2005 | |
| WO | 2006/031643 A1 | 3/2006 | |

* cited by examiner

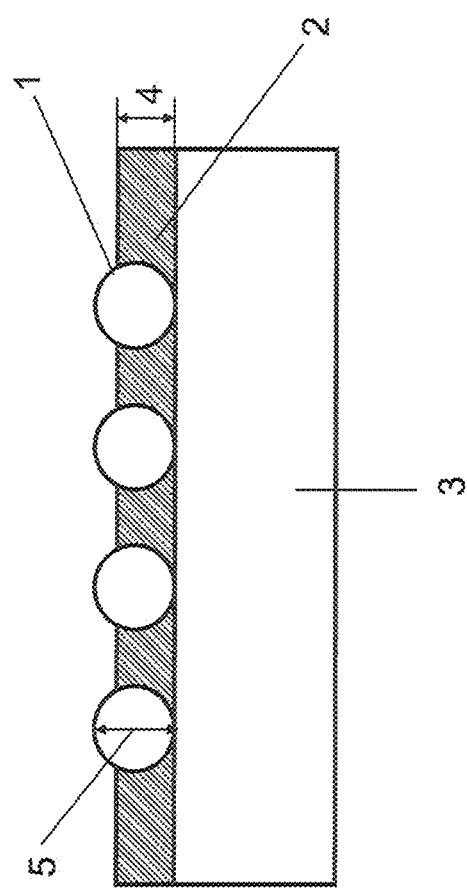

WHITE REFLECTION FILM

RELATED APPLICATIONS

This is a §371 of International Application No. PCT/JP2007/061596, with an international filing date of Jun. 8, 2007 (WO 2007/148544 A1, published Dec. 27, 2007), which is based on Japanese Patent Application No. 2006-173537, filed Jun. 23, 2006.

TECHNICAL FIELD

This disclosure relates to a white reflection film of improving the luminance of a backlight for a liquid crystal display, more particularly to a white reflection film used for a lamp reflector for an edge light type backlight for the liquid crystal display and a reflector of a direct type backlight for the liquid crystal display.

BACKGROUND

In a liquid crystal display, a backlight which illuminates liquid crystal cells is used. Depending on the type of the liquid crystal display, an edge light type backlight is used in a liquid crystal monitor, while a direct type backlight is used in a liquid crystal television. As a reflection film for these backlights, a porous white film formed by air bubbles (JPA1996-262208) is conventionally used. Furthermore, a white film, in which ultraviolet absorbing layers are multilayered to prevent the film from turning yellow due to ultraviolet rays emitted from a cold cathode fluorescent lamp, is also proposed (JPA2001-166295 and JPA2002-90515).

Various methods for improving various characteristics of the luminance are disclosed for these reflection films. Examples of the disclosed methods are a method wherein a light shielding layer is provided on a surface of the film opposite to a light source to improve the luminance in the edge light type (JPA2002-333510), a method wherein a refractive index difference generated between a spherical particle and binder is selected to control light diffusion so that front face luminance by a light diffuser sheet is improved (JPA2001-324608), and a method wherein diffusion of a surface of the film on the light source side is controlled in a reflection sheet in the direct type backlight so that any Luminance Mura (an unevenness in the luminance) in the backlight is improved (JPA2005-173546).

In a reflection film for a liquid crystal television, which has been rapidly advancing, cost reduction is strongly demanded, while the improvement of reflection characteristics of the reflection film is even more strongly demanded than in the past because the number of expensive sheets used in an upper section of the light source can be reduced when the luminance of the backlight is improved as a result of the improvement of the reflection characteristics of the reflection film. For example, in one constitution of the backlight for the liquid crystal television, a diffuser plate (thickness of approximately 2 mm), a diffuser film (thickness of approximately 200 μm-300 μm), a diffuser film (thickness of approximately 200 μm-300 μm), and a diffuser film (thickness of approximately 200 μm-300 μm) are multilayered from the light source side in this order. When the luminance of the entire backlight is improved by 2-3%, one of the diffuser films will be reduced in the constitution.

However, the reflection characteristics of the reflection film, which largely depends on a void structure inside the white film, cannot be really any further improved by simply making appropriate modifications to the void structure.

In a manner different from conventional methods, it could be helpful to improve the luminance by making appropriate modifications to the surface of the white film on the light source side. More specifically, it could be helpful to provide a white reflection film which is capable of improving reflection characteristics and thereby contributing to the improvement of luminance of a backlight such that a particular coating layer is provided on at least one surface of the white film.

SUMMARY

We provide a white reflection film comprising a coating layer including spherical particles on at least one surface of a white film, wherein, when particle diameters of the spherical particles are R and a thickness of the coating layer is H, an average number of the particles satisfying R>H in 100H square (square in which a side has the dimension of 100H) in a surface area of the coating layer is at least 10.

We also provide a lamp reflector for a backlight and a direct type backlight in which the white reflection film is used.

The white reflection film, wherein the particular coating layer is provided on at least one surface of the white film, can contribute to the improvement of the luminance of the backlight when it is used for the backlight.

BRIEF DESCRIPTION OF THE DRAWINGS

FIG. 1 is one example of a schematic sectional view illustrating a white reflection film.

DESCRIPTION OF REFERENCE SYMBOLS

1 spherical particle
2 binder resin
3 white film
4 thickness of coating layer (H)
5 particle diameter of spherical particle (R)

DETAILED DESCRIPTION

We intensively studied about a white reflection film which contributes to the improvement of luminance of a backlight by applying appropriate modifications to a surface of a white film on a light source side. We used a particular white film wherein a coating layer including spherical particles was provided on at least one surface of the white film, and certain conditions were set in relation to a relationship between a thickness of the coating layer and diameters of the spherical particles, and the number of the spherical particles. As a result, we found out that the improvement of the luminance of the white film thus constituted when it was used for the backlight was larger than that of the white film directly used without the coating layer.

The white reflection film comprises the coating layer including the spherical particles on at least one surface of the white film. Then, when the particle diameters of the spherical particles are R and the thickness of the coating layer is H, the average number of the particles satisfying R>H in 100H square (square in which a side has the dimension of 100H) in the surface area of the coating layer is necessarily at least 10. When the average number is below 10, the luminance improving effect cannot be obtained when the white film is incorporated to the back light. The average number is preferably at least 50, more preferably at least 100, and particularly preferably at least 150.

In around the 10H square (square in which a side has the dimension of 10H) of the surface area of the coating layer, an average number of the particles satisfying R>H is preferably at least 3. When the average number is at least 3, the luminance improving effect can be further improved when the white film is incorporated to the back light. The average number is more preferably at least 5, and particularly preferably at least 10.

The "spherical shape" of the spherical particle is not necessarily just a genuinely spherical shape. It is thereby denoted that the sectional shape of the particle is surrounded by curved surfaces as in such shapes as circular, elliptical, substantially circular, and substantially elliptical.

"The particle diameters R of the spherical particles", "the thickness H of the coating layer" and "the average number of the spherical particles satisfying R>H" are obtained as follows.

Measuring Method per 100H Square on the Surface Area of the Coating Layer i) The white reflection film is cut in a direction perpendicular to a planar surface of the film by the rotary microtome supplied by NIHON MICROTOME LABORATORY Corp. at the knife angle of inclination of three degrees. A sectional surface of the obtained film is observed by the scanning electron microscope ABT-32 supplied by TOPCON CORPORATION. Not a section on the surface of the coating layer where the spherical particles can be seen, but five positions on the surface of the coating layer which constitutes only binder resin forming the coating layer are observed, and a thickness of the coating layer is measured at the five sections. Then, an average value of the measured thicknesses is used as the thickness H of the coating layer.

ii) Next, the surface of the coating layer is observed by the optical microscope, OPTIPHOTO 200, supplied by KONIKA MINOLTA JAPAN, and the range of the 100H square (square of vertical: 100H and horizontal: 100H) is arbitrarily selected at five positions. The spherical particles present in the respective ranges of the 100H square are retrieved and observed by the optical microscope, and then, a longest diameter L and a shortest diameter S of the spherical particles are measured. The particle diameters R of the spherical particles are R=(L+S)/2.

iii) The number of the spherical particles satisfying R>H present in each of the five 100H squares is counted so that an average value by each of them is obtained. The obtained average value is used as the average number of the spherical particles satisfying R>H by 100H square.

Measuring Method per 10H Square on the Surface Area of the Coating Layer

The observation and the measurement are performed as in (i)-(iii) except that 10H square is targeted in place of 100H square.

A refractive index difference between a refractive index of the spherical particles and a refractive index of the binder resin constituting the coating layer is preferably below 0.30. The "refractive index difference" denotes an absolute value of the difference between the refractive index of the spherical particles and the refractive index of the binder resin. In the case of the refractive index difference being at least 0.30, the luminance improving effect may not be obtained when the white reflection film is incorporated to the backlight. The refractive index difference is more preferably below 0.10, even more preferably below 0.05, and particularly preferably below 0.03. Most preferably, there should be no refractive index difference, which means that the refractive index difference is 0.00.

The type of the spherical particle is not particularly limited, and either of an organic particle or an inorganic particle can be used. Examples of the usable organic spherical particles are acrylic resin particles, silicone-based resin particles, nylon-based resin particles, styrene-based resin particles, polyethylene-based resin particles, benzoguanamine-based resin particles, urethane-based resin particles, and the like. Examples of the usable inorganic spherical particles are silica, aluminum hydroxide, aluminum oxide, zinc oxide, barium sulfate, magnesium silicate, a material in which these substances are mixed, and the like. However, in the white reflection film, the spherical particles may be deteriorated by light emitted from a lamp such as a cold cathode fluorescent lamp during being used in the backlight, particularly ultraviolet rays (optical deterioration such as turning yellow, decomposition such as lowered molecules, or the like). Therefore, aliphatic organic spherical particles not including any aromatic compound are preferably used, and inorganic spherical particles of such type are more preferably used. When binder resin made of a copolymer including an acrylic monomer and an ultraviolet absorbent, as described later, is used as the binder resin of the coating layer, silicon dioxide, acrylic resin particles or silicone-based resin particles are preferably used in view of the refractive index difference between the binder resin and the spherical particles, particle dispersibility, coatability and the like, and acrylic resin particles are more preferably used.

A volume of the spherical particles included in the coating layer is not particularly limited as far as the luminance improvement can be obtained, and cannot be limited to a certain value because it depends on the type of the particles, the dispersibility in the coating solution, and the like. However, the volume is preferably at least 20 wt. % and more preferably at least 30 wt. % relative to the entire coating layer. The luminance improving effect may not be obtained when the volume is less than 20 wt. %. An upper limit of the volume is not necessarily particularly limited, however, is preferably at most 300 wt. % because the coatability may be deteriorated when the volume exceeds 300 wt. %.

A ratio S/L between the shortest diameter S and the longest diameter L of the spherical particles, which are measured according to the foregoing method, is preferably at least 0.7, more preferably at least 0.8, and particularly preferably at least 0.9. When the ratio S/L is below 0.7, the luminance improving effect may not be obtained.

A coefficient of variation CV is a value obtained by dividing a standard deviation of volume particle diameters of the spherical particles by an average volume particle diameter. The "volume particle diameter of the spherical particle" is a diameter of a genuine sphere having the same volume as that of the relevant spherical particle. The "average volume particle diameter" is an average value of volume particle diameters of a group of the relevant spherical particles. The coefficient of variation CV is measured according to a method recited in Examples as described later.

The coefficient of variation CV of the spherical particles is preferably at most 30%. When the coefficient of variation CV is larger than 30%, the uniformity of the particles diameter may be deteriorated, the light diffusion may be increased, and the luminance improving effect thereby obtained may be poor. The coefficient of variation CV is more preferably at most 20%, even more preferably at most 15%, and particularly preferably at most 10%. Most preferably, the volume particle diameters of all of the spherical particles are equal, which means that the coefficient of variation CV is 0%.

The thickness H of the coating layer is not particularly limited, however, is preferably 0.5-15 μm, more preferably 1-10 µm, and particularly preferably 1-5 µm. When the thickness H is below 0.5 µm, the light stability of the coating layer may be unsatisfactory. The thickness H exceeding 15 µm is not preferable in view of possible deterioration of the luminance and economic efficiency.

Referring to the white film as a substrate, a visible ray reflectance is preferably higher without any upper limit. Therefore, a white film including air bubbles therein is preferably used. Such a white film is not particularly limited, however, preferably examples thereof include a porous unstretched or biaxially stretched polypropylene film and a porous unstretched or stretched polyethylene terephthalate film. The methods for producing these films, and the like, are recited in detail in [0034]-[0057] in JPA1996-262208, [0007]-[0018] in JPA2002-90515, [0008]-[0034] in JPA2002-138150, and the like. Among the films recited in these References, the porous white biaxially stretched polyethylene terephthalate film, which is recited in JPA2002-90515, is particularly preferable as the white film based on the reason described earlier.

In the white reflection film, the white film as a substrate may be deteriorated by light emitted from a lamp such as a cold cathode fluorescent lamp during being used in the backlight, particularly ultraviolet rays (optical deterioration such as turning yellow, decomposition such as lowered molecules, or the like). Therefore, an ultraviolet absorbent and/or a light stabilizer are preferably included in the binder resin constituting the coating layer provided on one surface of the white film as a substrate.

The ultraviolet absorbents and light stabilizers included in the coating layer are broadly divided into two types, inorganic and organic.

Examples of the inorganic ultraviolet absorbent, which are conventionally known, are titanium dioxide, zinc oxide, cerium oxide, and the like. Among them, zinc oxide is most preferably in view of economic efficiency, ultraviolet absorbency, and photocatalytic activity. As the zinc oxide, FINEX-25LP and FINEX-50LP (supplied by SAKAI CHEMICAL INDUSTRY CO., LTD.), MAXLIGHT (registered trademark) ZS-032-D (supplied by SHOWA DENKO K.K.), and the like can be used.

These inorganic ultraviolet absorbents, which are solid particles, are poor in its coating layer strength and adhesion to the substrate, and therefore, are generally used in combination with the binder resin. The binder resin is not particularly limited as far as it is not deteriorated by light emitted from the lamp such as the cold cathode fluorescent lamp, particularly ultraviolet rays, however, aliphatic resin not including any aromatic compound is preferably used. When the white film as a substrate is a polyester film, polyester resin is most preferably used to obtain a sufficient adhesion. For example, an ultraviolet absorbent coating, SUMICEFINE (registered trademark) ZR-133 (supplied by SUMITOMO OSAKA CEMENT Col, Ltd.), or the like, can be used as a coating commercially available in which zinc oxide and a polyester-based composition are dispersed.

Examples of the organic ultraviolet absorbent are benzotriazole, benzophenone and the like. These ultraviolet absorbents only absorb the ultraviolet rays and cannot capture organic radicals generated by the irradiation of the ultraviolet rays. Therefore, the white film as a substrate may be deteriorated by the generated radicals. The light stabilizer is preferably used together to capture the radicals and the like, wherein a hindered amine-based compound is used.

It is known that these ultraviolet absorbent and the light stabilizer are bled out from the coating film, which deteriorates the light stability in a long term. Therefore, it is preferable to produce polymer by copolymerizing these compounds and reactive monomers via chemical bonds generated therebetween.

A manufacturing method, and the like, in relation to the copolymerization between the ultraviolet absorbent and the light stabilizer is recited in detail in [0019]-[0039] in JPA2002-90515. For example, HALSHYBRID (registered trademark) (supplied by NIPPON SHOKUBAI CO., LTD.) including, as its active ingredient, a copolymer of a reactive monomer containing acrylic monomer and/or methacrylic monomer and the ultraviolet absorbent, and a reactive monomer containing the light stabilizer, or the like, can be used.

Various additives can be added to the coating layer in such a range that does not inhibit the effect. Examples of the additives are organic and/or inorganic fine particles, fluorescent bleach, crosslinking agent, heat resistance stabilizer, oxidation resistance stabilizer, organic lubricant, nucleating additive, coupling agent and the like.

The spherical particles preferably include the ultraviolet absorbent and/or the light stabilizer therein in a manner similar to the resin binder. As possible methods for the inclusion, the ultraviolet absorbent and/or the light stabilizer may be added into the spherical particles, or the ultraviolet absorbent and/or light stabilizer containing reactive double bonds are chemically copolymerized to be thereby bonded to the resin when the resin constituting the spherical particles is produced. As in the latter example, the ultraviolet absorbent and/or the light stabilizer are preferably solidified through the chemical bond because the ultraviolet absorbent and/or the light stabilizer which are bled out from the spherical particles can be accordingly reduced.

In the white reflection film, an average reflectance in the wavelengths of 400-700 nm measured form the surface provided with the coating layer is preferably at least 85%, more preferably at least 87%, and particularly preferably at least 90%. When the average reflectance is below 85%, the luminance may not satisfy a required level depended on adopted liquid crystal displays. When the coating layer is provided on both surfaces of the white film, the average reflectance measured from the coating layer provided on one of the surfaces is preferably at least 85%.

When the coating layer is applied to the white film as a substrate, a coating solution can be applied according to any arbitrary method. Examples of the usable method include gravure coating, roll coating, spin coating, reverse coating, bar coating, screen coating, blade coating, air knife coating, dipping and the like. The coating solution for the formation of the coating layer may be applied when the white film as a substrate is produced (in-line coating), or may be applied to the white film after the completion of crystalline orientation (off-line coating).

The thus obtained white reflection film is capable of improving the luminance of the liquid crystal backlight. Further, according to the preferably aspects, the deterioration of the reflectance after a long use can be reduced. Therefore, the white reflection film can be suitably used as a reflector of an edge light type backlight for liquid crystal display and a reflector of a direct type backlight. Further, the white reflection film can be suitably used as reflectors of various planer light sources, and a sealing film of a solar battery module for which reflection characteristics are demanded.

EXAMPLES

Below are described measuring and evaluating methods.

(1) Coating Layer Thickness H, Spherical Particle Diameter R, Average Number of Spherical Particles Satisfying R>H Measurement per Surface Area 100H Square of the Coating Layer i) Samples produced in respective examples and comparative examples are cut in a direction perpendicular to a planar surface of the film at the knife angle of inclination of three degrees by the rotary microtome supplied by NIHON MICROTOME LABORATORY Corp. A sectional surface of the obtained film is observed by the scanning electron microscope ABT-32 supplied by TOPCON CORPORATION. Not a section on the surface of the coating layer where the spherical particles can be seen, a thickness of each of five positions on the surface of the coating layer which constitutes only binder resin forming the coating layer is measured. Then, an average value of the measured thicknesses is used as the thickness H of the coating layer.

ii) Next, the surface of the coating layer is observed by the optical microscope, OPTIPHOTO 200, supplied by KONIKA MINOLTA JAPAN, and the range of the 100H square (square of vertical: 100H and horizontal: 100H) is arbitrarily selected at five positions. The spherical particles present in these ranges of the 100H square are retrieved and observed by the optical microscope, and then, a longest diameter L and a shortest diameter S of the spherical particles are measured. $R=(L+S)/2$ is used as particle diameters R of the spherical particles.

iii) The number of the spherical particles satisfying R>H present in the 10H square at each of the five positions is counted, and an average value by each position is obtained. The average value is used as the average number of the spherical particles satisfying R>H by 10H square.

Measurement per Surface Area 10H Square of the Coating Layer

The observation and the measurement are performed as in (i)-(iii) except that 10H square is targeted in place of 100H square.

Five of the spherical particles observed above were arbitrarily selected, and an average value of these particles diameters R was obtained.

(2) Ratio Between the Shortest Diameter S and the Longest Diameter L of the Particles The S/L value was obtained for each of the five spherical particles selected to obtain the average value of the particle diameters R in 1), and an average value thereof was used as the value of S/L in this sample.

(3) Refractive Index of Binder Resin, Refractive Index of Spherical Particle

When the refractive index values of the binder resin and the spherical particles are unclear, they are obtained as follows:

i) The binder resin is extracted from the sample coating layer by using an organic solvent, and the organic solvent is thereafter distilled away. Then, the measurement was performed for the light in a wavelength of 589.3 nm at 20° C. according to the ellipsometry. An obtained value is used as the "refractive index of the binder resin."

ii) The sample coating layer was dipped in the organic solvent, and the coating layer was stripped and obtained, and thereafter pressed and slid with respect to slide glass so that the spherical particles came off from the coating layer. It was confirmed that borders of the thereby obtained spherical particles could not be observed according to the Becke's line detecting method at a temperature where the refractive index of the liquid organic compound was known. The refractive index of the used liquid organic compound is used as the "refractive index of the spherical particles."

(4) Volume Particle Diameter, Average Volume Particle Diameter, and Coefficient of Variation CV of the Spherical Particles In the measurement of volume particle diameters, an average volume particle diameter, and a coefficient of variation CV of the spherical particles obtained in 3), Coulter Multisizer III (supplied by BECKMAN COULTER CO., LTD.) was used as a particle size distribution measuring device in which the aperture electric resistance method was utilized. An electric resistance of an electrolyte solution corresponding to a volume of particles when the particles penetrate through the aperture was measured so that the number and the volume of the particles were measured. First, a small amount of sample was dispersed in a dilute surface active agent solution. Next, such an amount of the sample that an aperture (aperture in detecting portion) penetration reached 10-20% was added to a container of the relevant electrolytic solution while watching a monitor display. The volume particle diameter was continuously measured and automatically calculated until the number of the penetrating particles reached 100,000 so that the average volume particle diameter, a standard deviation of the volume particle diameters, and the coefficient of variation CV were obtained. The value of the coefficient of variation CV can be obtained as follows:

Coefficient of variation CV (%)=standard deviation of volume particle diameters (μm)/average volume particle diameter (μm)×100.

(5) Content Rate of the Included Spherical Particles

When the content rate of the spherical particles in the coating layer is unclear, it is obtained as follows:

i) The sample coating layer was scraped off with a sharp knife so that 0.05 g of the coating layer was obtained from the white film, and the binder resin component was extracted by an organic solvent.

ii) The substance which was not dissolved in the organic solvent was regarded as the spherical particles, and a weight A (g) of the spherical particles was measured. A value obtained by the following formula was used as the "content rate of the spherical particles":

content rate of the spherical particles (weight %)=weight A (g) of the spherical particles/0.05 (g)×100

(6) Average Reflectance

An average value of the reflectance per an interval of 10 nm in 400-700 nm was calculated in a state where the φ60 integrating sphere 130-0632 (supplied by Hitachi Ltd.) and the 10-degree tilting spacer were mounted on the spectrophotometer U-3410 (supplied by Hitachi Ltd.). The product number 210-0740 supplied by HITACHI INSTRUMENTS SERVICE CO., LTD. was used as a standard white plate. The average value was measured for three samples, which was used as the average reflectance.

(7) Average Reflectance After a Durability Test

The ultraviolet was intentionally irradiated by the ultraviolet deterioration acceleration testing device iSUPER UV tester SUV-W131 (supplied by IWASAKI ELECTRIC CO., LTD.) under the following conditions, and then, the average reflectance was obtained. The average value was obtained for three samples, which was used as the average reflectance after the durability test.

Conditions for Ultraviolet Irradiation
    illuminance: 100 mW/cm$^2$
    temperature: 60° C.
    relative humidity: 50% RH
    irradiation time: 72 hours
(8) Average Luminance The 21-inch direct type backlight (lamp tube diameter: 3 mm φ, number of lamps: 12, distance between lamps: 25 mm, distance between white reflection film and center of lamps: 4.5 mm, distance between diffuser plate and center of lamps: 13.5 mm) was used to measure the luminance in optical sheets of the following two models:
    Model 1: the diffuser plate RM803 (supplied by Sumitomo Chemical Co., Ltd., thickness: 2 mm)/two sheets of the diffuser sheet GM3 (supplied by KIMOTO CO., LTD., thickness: 100 μm)
    Model 2: The diffuser plate RM803 (supplied by Sumitomo Chemical Co., Ltd., thickness: 2 mm)/diffuser sheet GM3 (supplied by KIMOTO CO., LTD., thickness: 100 μm)/prism sheet BEF-II (supplied by 3M, thickness 130 μm)/deflection isolation sheet DBEF (supplied by 3M, thickness 400 μm)

In the luminance measurement, the luminance (cd/m$^2$) was measured by the color luminance meter BM-7fast (supplied by TOPCON CORPORATION) after a cold cathode fluorescent lamp was turned on for 60 minutes to obtain a stable light source. An average value was calculated for three samples, which was used as the average luminance.

Example 1

10.0 g of HALSHYBRID (registered trademark) UV-G13 (acrylic copolymer, solution of 40% concentration, refractive index: 1.49, supplied by NIPPON SHOKUBAI CO., LTD.), toluene: 13.2 g, and 1.0 g of silicon dioxide particles (supplied by FUSO CHEMICAL CO., LTD., Quotron (registered trademark) SP series, SP-3C, refractive index: 1.47, coefficient of variation CV: 12%) as spherical particles were added while stirring so that the coating solution was prepared. The coating solution was applied to one surface of a white film of 250 μm made of porous biaxially stretched polyethylene terephthalate (supplied by TORAY INDUSTRIES, INC, Lumiror (registered trademark) E6SL) by using metaling bar#12, and the resulting white film was dried at 120° C. for a minute so that the coating layer having the dry weight of 3.5 g/m$^2$ was provided. Thus, the white reflection film was obtained.

Example 2

10.0 g of HALSHYBRID (registered trademark) UV-G13 (acrylic copolymer, solution of 40% concentration, refractive index: 1.49, supplied by NIPPON SHOKUBAI CO., LTD.), toluene: 19.2 g, and 1.7 g of silicon dioxide particles (supplied by FUSO CHEMICAL CO., LTD., Quotron (registered trademark) SP series, SP-3C, refractive index: 1.47, coefficient of variation CV: 12%) as spherical particles were added while stirring so that the coating solution was prepared. The coating solution was applied to one surface of the white film of 250 μm made of porous biaxially stretched polyethylene terephthalate (supplied by TORAY INDUSTRIES, INC, Lumiror (registered trademark) E6SL) by using metaling bar #12, and the resulting white film was dried at 120° C. for a minute so that the coating layer having the dry weight of 3.5 g/m$^2$ was provided. Thus, the white reflection film was obtained.

Example 3

10.0 g of HALSHYBRID (registered trademark) UV-G13 (acrylic copolymer, solution of 40% concentration, refractive index: 1.49, supplied by NIPPON SHOKUBAI CO., LTD.), toluene: 29.2 g, and 4.0 g of silicon dioxide particles (supplied by FUSO CHEMICAL CO., LTD., Quotron (registered trademark) SP series, SP-3C, refractive index: 1.47, coefficient of variation CV: 12%) as spherical particles were added while stirring so that the coating solution was prepared. The coating solution was applied to one surface of the white film of 250 μm made of porous biaxially stretched polyethylene terephthalate (supplied by TORAY INDUSTRIES, INC, Lumiror (registered trademark) E6SL) by using metaling bar#12, and the resulting white film was dried at 120° C. for a minute so that the coating layer having the dry weight of 3.5 g/m$^2$ was provided. Thus, the white reflection film was obtained.

Example 4

10.0 g of HALSHYBRID (registered trademark) UV-G13 (acrylic copolymer, solution of 40% concentration, refractive index: 1.49, supplied by NIPPON SHOKUBAI CO., LTD.), toluene: 29.2 g, and 4.0 g of polystyrene particles (supplied by SEKISUI PLASTICS CO., LTD., TECHPOLYMER (registered trademark) SBX-8, refractive index: 1.59, coefficient of variation CV: 37%) as spherical particles were added while stirring so that the coating solution was prepared. The coating solution was applied to one surface of the white film of 250 μm made of porous biaxially stretched polyethylene terephthalate (supplied by TORAY INDUSTRIES, INC, Lumiror (registered trademark) E6SL) by using metaling bar#12, and the resulting white film was dried at 120° C. for a minute so that the coating layer having the dry weight of 3.5 g/m$^2$ was provided. Thus, the white reflection film was obtained.

Example 5

10.0 g of HALSHYBRID (registered trademark) UV-G13 (acrylic copolymer, solution of 40% concentration, refractive index: 1.49, supplied by NIPPON SHOKUBAI CO., LTD.), toluene: 29.2 g, and 4.0 g of acrylic particles (supplied by SEKISUI PLASTICS CO., LTD., TECHPOLYMER (registered trademark) MB30X-8, refractive index: 1.49, coefficient of variation CV: 44%) as spherical particles were added while stirring so that the coating solution was prepared. The coating solution was applied to one surface of the white film of 250 μm made of porous biaxially stretched polyethylene terephthalate (supplied by TORAY INDUSTRIES, INC, Lumiror (registered trademark) E6SL) by using metaling bar#12, and the resulting white film was dried at 120° C. for a minute so that the coating layer having the dry weight of 3.5 g/m$^2$ was provided. Thus, the white reflection film was obtained.

Example 6

10.0 g of HALSHYBRID (registered trademark) UV-G13 (acrylic copolymer, solution of 40% concentration, refractive index: 1.49, supplied by NIPPON SHOKUBAI CO., LTD.), ethyl acetate: 8.6 g, and 0.08 g of acrylic particles (supplied by SEKISUI PLASTICS CO., LTD., TECHPOLYMER (registered trademark) SSX series, SSX-105, refractive index: 1.49, average particle diameter: 5.0 μm, coefficient of variation CV: 9%) as spherical particles were added while stirring so that the coating solution was prepared. The coating solution was applied to one surface of the white film of 250 μm made of porous biaxially stretched polyethylene terephthalate (supplied by TORAY INDUSTRIES, INC, Lumiror (registered trademark) E6SL) by using metaling bar#12, and the resulting white film was dried at 120° C. for a minute so that the coating layer having the dry weight of 3.5 g/m² was provided. Thus, the white reflection film was obtained.

Example 7

10.0 g of HALSHYBRID (registered trademark) UV-G13 (acrylic copolymer, solution of 40% concentration, refractive index: 1.49, supplied by NIPPON SHOKUBAI CO., LTD.), ethyl acetate: 7.3 g, and 0.44 g of acrylic particles (supplied by SEKISUI PLASTICS CO., LTD., TECHPOLYMER (registered trademark) SSX series, XX-16FP, refractive index: 1.49, average particle diameter: 10.0 μm, coefficient of variation CV: 9%) as spherical particles were added while stirring so that the coating solution was prepared. The coating solution was applied to one surface of the white film of 250 μm made of porous biaxially stretched polyethylene terephthalate (supplied by TORAY INDUSTRIES, INC, Lumiror (registered trademark) E6SL) by using metaling bar#12, and the resulting white film was dried at 120° C. for a minute so that the coating layer having the dry weight of 9.0 g/m² was provided. Thus, the white reflection film was obtained.

Example 8

10.0 g of HALSHYBRID (registered trademark) UV-G13 (acrylic copolymer, solution of 40% concentration, refractive index: 1.49, supplied by NIPPON SHOKUBAI CO., LTD.), ethyl acetate: 11.9 g, and 1.0 g of acrylic particles (supplied by SEKISUI PLASTICS CO., LTD., TECHPOLYMER (registered trademark) SSX series, SSX-105 refractive index: 1.49, average particle diameter: 5.0 μm, coefficient of variation CV: 9%) as spherical particles were agitated to be mixed so that the coating solution was prepared. The coating solution was applied to one surface of the white film of 250 μm made of porous biaxially stretched polyethylene terephthalate (supplied by TORAY INDUSTRIES, INC, Lumiror (registered trademark) E6SL) by using metaling bar#12, and the resulting white film was dried at 120° C. for a minute so that the coating layer having the dry weight of 3.5 g/m² was provided. Thus, the white reflection film was obtained.

Example 9

10.0 g of HALSHYBRID (registered trademark) UV-G13 (acrylic copolymer, solution of 40% concentration, refractive index: 1.49, supplied by NIPPON SHOKUBAI CO., LTD.), ethyl acetate: 11.9 g, and 1.0 g of acrylic particles (supplied by SEKISUI PLASTICS CO., LTD., TECHPOLYMER (registered trademark) MBX series, XX-09FP, refractive index: 1.49, average particle diameter: 5.0 μm, coefficient of variation CV: 27%) as spherical particles were added while stirring so that the coating solution was prepared. The coating solution was applied to one surface of the white film of 250 μm made of porous biaxially stretched polyethylene terephthalate (supplied by TORAY INDUSTRIES, INC, Lumiror (registered trademark) E6SL) by using metaling bar#12, and the resulting white film was dried at 120° C. for a minute so that the coating layer having the dry weight of 3.5 g/m² was provided. Thus, the white reflection film was obtained.

Example 10

Method for Producing Spherical Particles A 70 parts by weight of methyl methacrylate, 10 parts by weight of trimethylolpropane triacrylate as a multifunctional monomer constituting a crosslinking structure, 3 parts by weight of 2,2,6,6-tetramethyl-4-piperidylmethacrylate as a hindered amine-based polymer compound, 10 parts by weight of 2-(2'-hydroxy-5'-methacryloxyethylphenyl)-2H-benzotriazole as a benzotriazole-based polymer compound, and 1 parts by weight of lauroyl peroxide as a polymerization starter were put into a four-neck flask equipped with a stirring device, a temperature gauge and a nitrogen gas introducing pipe and having the capacity of one liter, and 1 parts by weight of polyvinyl alcohol (PVA-224, KURARAY CO., LTD.) as a dispersion stabilizer and 200 parts by weight of water were added to the solution. The resulting solution was stirred for three minutes at the rotation of 9,000 rpm by using a homomixer, and the polymer compound was dispersed in water. Then, the dispersive solution was heated at 75° C. for two hours and retained at the same temperature to be reacted, and the resulting solution was further heated to 90° C. and reacted for three hours.

After the reaction, the dispersive solution was cooled down to room temperature and filtered by a mesh filter having openings of 40 μm so that aggregates were removed therefrom. The resulting dispersive solution did not include aggregates, which showed a favorable filterability.

An average diameter of the resin particles dispersed in the dispersive solution thus filtered is 6.4 μm, and the resin particles were genuinely spherical.

The dispersive solution of the resin particles was thus cleaned according to the conventional method and filtered so that the resin particles and the dispersive medium were separated from each other. Then, the separated resin particles were dried and classified, and then, the spherical particles A (coefficient of variation CV: 15%) were obtained.

Method for Producing the White Reflection Film 10.0 g of HALSHYBRID (registered trademark) UV-G13 (acrylic copolymer, solution of 40% concentration, refractive index: 1.49, supplied by NIPPON SHOKUBAI CO., LTD.), ethyl acetate: 11.9 g, and 1.0 g of the spherical particles A (refractive index: 1.49, average particle diameter: 6.4 μm, coefficient of variation CV: 15%) were added while stirring so that the coating solution was prepared. The coating solution was applied to one surface of the white film of 250 μm made of porous biaxially stretched polyethylene terephthalate (supplied by TORAY INDUSTRIES, INC, Lumiror (registered trademark) E6SL) by using metaling bar#12, and the resulting white film was dried at 120° C. for a minute so that the coating layer having the dry weight of 3.5 g/m² was provided. Thus, the white reflection film was obtained.

Example 11

The same process as that of Example 9 was adopted except that 1.0 g of silicon particles (supplied by GE TOSHIBA SILICONE CO., Ltd., TOSPEARL (registered trademark), TOSPEARL 145, refractive index: 1.42, average particle diameter 4.5: μm, coefficient of variation CV: 12%) were used as the spherical particles, so that the coating layer was provided. Thus, the white reflection film was obtained.

Comparative Example 1

The white film of 250 μm made of porous biaxially, stretched polyethylene terephthalate (supplied by TORAY INDUSTRIES, INC, Lumiror (registered trademark) E6SL was directly used as the white reflection film without providing the coating layer thereon.

Comparative Example 2

10.0 g of HALSHYBRID (registered trademark) UV-G13 (acrylic copolymer, solution of 40% concentration, refractive index: 1.49, supplied by NIPPON SHOKUBAI CO., LTD.), toluene: 8.4 g, and 0.04 g of silicon dioxide particles (supplied by FUSO CHEMICAL CO., LTD., Quotron (registered trademark) SP series, SP-3C, refractive index: 1.45, coefficient of variation CV: 12%) as spherical particles were added while stirring so that the coating solution was prepared. The coating solution was applied to one surface of the white film of 250 μm made of porous biaxially stretched polyethylene terephthalate (supplied by TORAY INDUSTRIES, INC, Lumiror (registered trademark) E6SL) by using metaling bar#12, and the resulting white film was dried at 120° C. for a minute so that the coating layer having the dry weight of 3.5 g/m² was provided. Thus, the white reflection film was obtained.

Comparative Example 3

10.0 g of HALSHYBRID (registered trademark) UV-G13 (acrylic copolymer, solution of 40% concentration, refractive index: 1.49, supplied by NIPPON SHOKUBAI CO., LTD.), toluene: 29.2 g, and 4.0 g of silica powders (supplied by FUJI SILYSIA CHEMICAL CO., LTD., SYLOPHOBIC (registered trademark) 100, refractive index: 1.47, coefficient of variation CV: 39%) as particles were added while stirring so that the coating solution-was prepared. The coating solution was applied to one surface of the white film of 250 μm made of porous biaxially stretched polyethylene terephthalate (supplied by TORAY INDUSTRIES, INC, Lumiror (registered trademark) E6SL) by using metaling bar#12, and the resulting white film was dried at 120° C. for a minute so that the coating layer having the dry weight of 3.5 g/m² was provided. Thus, the white reflection film was obtained.

Comparative Example 4

10.0 g of HALSHYBRID (registered trademark) UV-G13 (acrylic copolymer, solution of 40% concentration, refractive index: 1.49, supplied by NIPPON SHOKUBAI CO., LTD.), toluene: 29.2 g, and 4.0 g of titanium dioxide particles (supplied by SHOWA DENKO K. K., MAXLIGHT (registered trademark) TS series, TS-04-D, refractive index: 2.52, coefficient of variation CV: 36%) as particles were added while stirring so that the coating solution was prepared. The coating solution was applied to one surface of the white film of 250 μm made of porous biaxially stretched polyethylene terephthalate (supplied by TORAY INDUSTRIES, INC, Lumiror (registered trademark) E6SL) by using metaling bar#12, and the resulting white film was dried at 120° C. for a minute so that the coating layer having the dry weight of 3.5 g/m² was provided. Thus, the white reflection film was obtained.

TABLE 1

| | Type of spherical particle | Average number per 100 H square [numbers] | Average number per 10 H square [numbers] | Ratio between shortest diameter and longest diameter (S/L) | Refractive index difference in comparison to binder | Content rate of particles (wt. %) | coefficient of Variation [%] | Thickness H of coating layer [μm] | Average value of particle diameters R [μm] (* 1) |
|---|---|---|---|---|---|---|---|---|---|
| Example 1 | Silicon dioxide | 120 | 3 | 0.98 | 0.02 | 10 | 12 | 2.9 | 5.1 |
| Example 2 | Silicon dioxide | 420 | 5 | | | 30 | 12 | 2.5 | 4.9 |
| Example 3 | Silicon dioxide | 830 | 10 | | | 50 | 12 | 1.5 | 5.3 |
| Example 4 | Polystyrene | 488 | 4 | 0.97 | 0.10 | 50 | 37 | 1.2 | 7.6 |
| Example 5 | Acrylic particle | 383 | 5 | 0.98 | 0.00 | 50 | 44 | 1.3 | 8.1 |
| Example 6 | Acrylic particle | 13 | 0 | 0.97 | 0.00 | 2 | 9 | 3.0 | 5.1 |
| Example 7 | Acrylic particle | 140 | 3 | 0.98 | 0.00 | 10 | 9 | 7.8 | 10.3 |
| Example 8 | Acrylic particle | 530 | 6 | 0.97 | 0.00 | 20 | 9 | 2.7 | 4.9 |
| Example 9 | Acrylic particle | 340 | 3 | 0.97 | 0.00 | 20 | 27 | 2.5 | 5.0 |
| Example 10 | Acrylic particle A | 430 | 6 | 0.95 | 0.00 | 20 | 15 | 2.8 | 6.4 |
| Example 11 | Silicone | 450 | 4 | 0.96 | 0.07 | 20 | 12 | 2.4 | 4.5 |
| Comparative Example 1 | None | — | — | — | — | — | — | — | — |
| Comparative Example 2 | Silicon dioxide | 7 | 0 | 0.98 | 0.04 | 1 | 12 | 3.5 | 5.1 |
| Comparative Example 3 | Silicon dioxide | 0 | 0 | 0.90 | 0.04 | 50 | 39 | 3.6 | 2.5 |
| Comparative Example 4 | Titanium dioxide | 0 | 0 | 0.85 | 1.03 | 50 | 36 | 3.6 | 0.1 |

Average value of particle diameters R of arbitrary five spherical particles

TABLE 2

| | Average reflectivity (%) | | Luminance (%) | |
|---|---|---|---|---|
| | Before durability test | After durability test | Model 1 | Model 2 |
| Example 1 | 99.8 | 99.7 | 6820 | 4510 |
| Example 2 | | 99.8 | 6830 | 4530 |
| Example 3 | | 99.8 | 6880 | 4550 |
| Example 4 | 99.7 | 95.2 | 6875 | 4545 |
| Example 5 | 99.7 | 99.6 | 6830 | 4520 |
| Example 6 | 99.7 | 99.6 | 6810 | 4505 |
| Example 7 | 99.7 | 99.7 | 6810 | 4505 |
| Example 8 | 99.7 | 99.6 | 6890 | 4560 |
| Example 9 | 99.7 | 99.6 | 6880 | 4550 |

TABLE 2-continued

|  | Average reflectivity (%) | | Luminance (%) | |
|---|---|---|---|---|
|  | Before durability test | After durability test | Model 1 | Model 2 |
| Example 10 | 99.7 | 99.7 | 6885 | 4555 |
| Example 11 | 99.7 | 99.6 | 6870 | 4560 |
| Comparative Example 1 | 99.5 | 71.4 | 6800 | 4500 |
| Comparative Example 2 | 99.8 | 99.8 | 6800 | 4495 |
| Comparative Example 3 | 99.7 | 99.7 | 6770 | 4460 |
| Comparative Example 4 | 99.9 | 99.8 | 6780 | 4480 |

In any of Examples 1 to 11, the luminance improving effect was observed. Among them, the durability was favorable and the luminance improvement was remarkable particularly in Examples 3, 8 and 10.

In Examples 1 to 3 wherein the spherical silica particles were used, the average number of the particles satisfying R>H was at least 10 in the surface area 100H square of the coating layer, which showed the luminance improvement. Among Examples, the luminance was at the highest level in Example 3 where the amount of included particles was large.

In Example 4 wherein the polystyrene particles were used, the average reflectance after the durability test was deteriorated.

In Examples 5 to 9 wherein the spherical acrylic particles were used, the average number of the particles satisfying R>H was at least 10 in the surface area 100H square of the coating layer, and the luminance improvement was confirmed in all of them. Among Examples, the luminance improvement was particularly remarkable in Examples 8 and 9 wherein the coefficient of variation was at most 30% and the amount of the included particles was at least 20 wt. %, while the luminance improvement was less than expected in Examples 6 and 7 wherein the amount of the included particles was below 20 wt. %.

In Example 10 wherein the spherical acrylic particles included the ultraviolet absorbent and/or the light stabilizer, the luminance was remarkably improved, the deterioration of the reflectance after the durability test was not observed, and the light stability was favorable.

In Example 11 wherein the silicon particles were used, the average number of the particles satisfying R>H was at least 10 in the surface area 100H square of the coating layer, and the luminance improvement was confirmed.

In any of Comparative Examples 1-3, there were the particles satisfying R>H in the surface area 100H square of the coating layer, which, however, was less than 10, which hardly showed any luminance improvement.

Industrial Applicability

The white reflection film is suitably applicable as a reflector of an edge light type backlight for a liquid crystal display, and a reflector of a direct type backlight. In addition to these, it is also suitably applicable as reflectors for various planer light sources, and a sealing film of a solar battery module for which reflection characteristics are demanded.

The invention claimed is:

1. A white reflection film comprising a coating layer including spherical particles made of at least one selected from the group consisting of silicon dioxide, acryl and silicone on at least one surface of a white film, wherein the coating layer is an outermost layer of the white reflection film, wherein, thickness H of the coating layer is 1.3 to 2.8 μm, wherein, when particle diameters of the spherical particles R, the average value of particle diameters is 4.5 to 4.9 μm, and the coating layer has a thickness H, an average number of the particles satisfying R >H in 100H square in a surface area of the coating layer is 450 to 530, and wherein average reflectance in wavelengths of 400-700 nm measured from a surface of the coating layer is at least 90%, the surface of the coating layer has a section which is only binder resin forming the coating layer and a content rate of the spherical particles in the coating layer is 20 wt. % to 50 wt. % relative to the entire coating layer.

2. The white reflection film as claimed in claim 1, wherein an average number of the particles satisfying R>H in 10H square in the surface area of the coating layer is at least 3.

3. The white reflection film as claimed in claim 1, wherein a refractive index difference between a refractive index of the spherical particles and a refractive index of binder resin constituting the coating layer is below 0.30.

4. The white reflection film as claimed in claim 1, wherein a coefficient of variation CV of the spherical particles is at most 30%.

5. The white reflection film as claimed in claim 1, wherein a ratio S/L between a shortest diameter S and a longest diameter L of the spherical particles is at least 0.7.

6. The white reflection film as claimed in claim 1, wherein binder resin constituting the coating layer includes an ultraviolet absorbent and/or a light stabilizer.

7. The white reflection film as claimed in claim 1, wherein the spherical particles include an ultraviolet absorbent and/or a light stabilizer.

8. A lamp reflector for a backlight, wherein the white reflection film as claimed in any of claims 1 to 5 and 6-7 is provided so that a surface thereof provided with the coating layer is directed toward a light source side.

9. A direct backlight, wherein the white reflection film as claimed in any of claims 1 to 5 and 6-7 is provided so that a surface thereof provided with the coating layer is directed toward a light source side.

* * * * *